(12) United States Patent
Movsisyan

(10) Patent No.: US 11,108,793 B2
(45) Date of Patent: Aug. 31, 2021

(54) PREEMPTIVE ALERTS IN A CONNECTED ENVIRONMENT

(71) Applicant: VMware, Inc., Palo Alto, CA (US)

(72) Inventor: Vardan Movsisyan, Yerevan (AM)

(73) Assignee: VMWARE, INC., Palo Alto, CA (US)

( * ) Notice: Subject to any disclaimer, the term of this patent is extended or adjusted under 35 U.S.C. 154(b) by 859 days.

(21) Appl. No.: 15/142,593

(22) Filed: Apr. 29, 2016

(65) Prior Publication Data

US 2017/0318036 A1 Nov. 2, 2017

(51) Int. Cl.
*H04L 29/06* (2006.01)
*H04L 12/24* (2006.01)

(52) U.S. Cl.
CPC ........ *H04L 63/1425* (2013.01); *H04L 41/069* (2013.01); *H04L 41/0681* (2013.01); *H04L 63/1458* (2013.01)

(58) Field of Classification Search
CPC ............. H04L 63/1458; H04L 63/1416; H04L 63/1425; H04L 43/0823; H04L 43/16; H04L 2463/141; H04L 2463/142; H04L 2463/143; H04L 41/0681; H04L 41/069
See application file for complete search history.

(56) References Cited

U.S. PATENT DOCUMENTS

| | | | | |
|---|---|---|---|---|
| 8,312,540 B1 * | 11/2012 | Kahn | .................... | G06F 21/552 713/183 |
| 9,654,501 B1 * | 5/2017 | Ast | ..................... | H04L 63/1458 |
| 2005/0015624 A1 * | 1/2005 | Ginter | ..................... | G06F 21/55 726/4 |
| 2006/0137009 A1 * | 6/2006 | Chesla | ................ | H04L 63/1408 726/22 |
| 2010/0131645 A1 | 5/2010 | Marvasti | | |
| 2012/0331127 A1 * | 12/2012 | Wang | .................... | G06F 9/5083 709/224 |
| 2013/0147902 A1 * | 6/2013 | Weiser | ..................... | H04N 7/15 348/14.08 |
| 2016/0036833 A1 * | 2/2016 | Ardeli | .................. | H04L 63/101 726/22 |

OTHER PUBLICATIONS

Peng et al., Proactively Detecting Distributed Denial of Service Attacks Using Source IP Address Monitoring (Year: 2004).*

(Continued)

*Primary Examiner* — Huan V Doan

(57) ABSTRACT

The present disclosure is related to devices, systems, and methods for preemptive alerts in a connected environment. An example device can include instructions to receive a log from a first log source, determine whether a pattern of events in the log exceeds an alert threshold of the first log source, wherein the pattern of events is associated with an event source, in response to the pattern of events exceeding the alert threshold, trigger an alert particular to the event source, and in response to the pattern of events exceeding the alert threshold, initiate a sensitivity threshold of a second log source that provides a same functionality as the first log source, wherein the sensitivity threshold is more sensitive than the alert threshold, and wherein the sensitivity threshold is particular to the event source.

19 Claims, 4 Drawing Sheets

(56) References Cited

OTHER PUBLICATIONS

Gupta et al., An Efficient Analytical Solution to Thwart DDoS Attacks in Public Domain, 7 pages (Year: 2012).*
Author Unknown, VMware vRealize Log Insight Administration Guide, Copyright 2015, EN-001885-00, VMware, Inc., https://pubs.vmware.com/log-insight-30/topic/com.vmware.ICbase/PDF/log-insight-30-administration-guide.pdf, (accessed Feb. 19, 2016).
Author Unknown, VMware vRealize Log Insight Agent Administration Guide, Copyright 2016, EN-001831-00, VMware, Inc., https://pubs.vmware.com/log-insight-30/topic/com.vmware.ICbase/PDF/log-insight-30-agent-administration-guide.pdf (accessed Feb. 19, 2016).
Author Unknown, VMware vRealize Log Insight Developers Guide, Copyright 2015, EN-001660-00, VMware, Inc., https://pubs.vmware.com/log-insight-30/topic/com.vmware.ICbase/PDF/log-insight-30-developers-guide.pdf (accessed Feb. 19, 2016).
Author Unknown, VMware vRealize Log Insight Getting Started Guide, Copyright 2015, EN-001658-00, VMware, Inc., https://pubs.vmware.com/log-insight-30/topic/com.vmware.ICbase/PDF/log-insight-30-getting-started-guide.pdf (accessed Feb. 19, 2016).
Author Unknown, VMware vRealize Log Insight Security Guide, Copyright 2016, EN-001662-00, VMware, Inc., https://pubs.vmware.com/log-insight-30/topic/com.vmware.ICbase/PDF/log-insight-30-security-guide.pdf (accessed Feb. 19, 2016).
Author Unknown, VMware vRealize Log Insight User's Guide, Copyright 2015, EN-001661-00, VMware, Inc., https://pubs.vmware.com/log-insight-30/topic/com.vmware.ICbase/PDF/log-insight-30-users-guide.pdf (accessed Feb. 19, 2016).

* cited by examiner

PREEMPTIVE ALERTS IN A CONNECTED ENVIRONMENT

BACKGROUND

Multiple log sources providing a same or similar functionality can exist in a network. These log sources can be monitored by a log management server. For example, a log management server can monitor a number of email servers.

DETAILED DESCRIPTION

Figure 1:
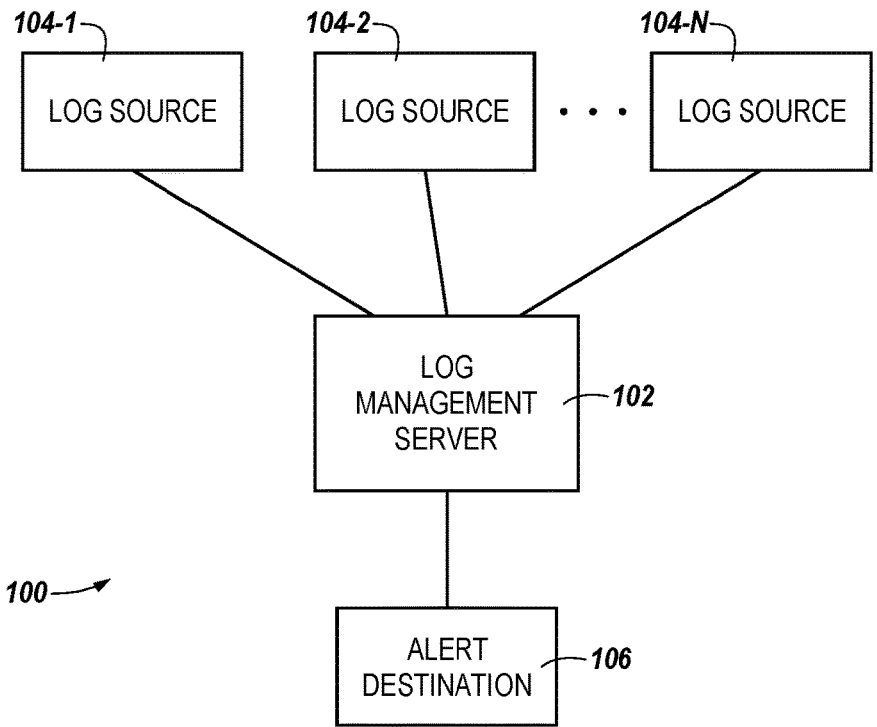
FIG. 1 is a general logical diagram of an infrastructure with preemptive alerts in a connected environment according to the present disclosure.

A log source of a connected environment (hereinafter "network") can be configured with one or more thresholds that, when exceeded, trigger alerts. As used herein "log source" refers to a source of one or more logs (e.g., event logs). In general, a log source can refer to any entity capable of generating logs. For instance, a log source can be a server (e.g., a physical server), a virtual computing instance, a host, a network device, a desktop computing device, an event channel, a log aggregator, a log file, etc.

One such threshold, for example, can be a particular number of (e.g., one hundred) failed login attempts by a particular client to an email server. In some embodiments, the threshold can be set by a user, such as a network administrator. In some embodiments, the threshold may be a default threshold and/or otherwise set by a computing device. In either case, a particular client attempting and failing to login to the server a number of times that exceeds the threshold can trigger an alert. The alert may indicate that an attack from a nefarious entity is underway. In some instances, the alert can trigger the prevention of any further login attempts to that server from that particular client.

However, once prevented from attempting to gain entry to the server, the client may seek to login to another (second) server of the network. In previous approaches, the client may be able to again make one hundred failed attempts, this time to the second server, before a similar alert is triggered. In networks comprised of a multitude of log sources that do not communicate or share such alerts throughout the network, the nefarious entity may be provided with an undesirably large number of opportunities for entry.

To alleviate these shortcomings, the present disclosure is directed towards utilizing such alerts in a connected environment to proactively deal with problems that may affect additional log sources. Stated another way, embodiments herein can enable alerts to be leveraged between similar, connected log sources (e.g., "sibling" log sources) of a network. When a pattern of events triggering an alert in one log source is detected, that alert can preemptively alert what may happen in other log sources.

As a result, embodiments of the present disclosure can react more quickly than previous approaches to attacks from nefarious entities, for instance, thereby reducing the ability for an attacker to successfully gain entry to the network. It is noted that while attacks, such as denial of service (DOS) attacks, distributed denial-of-service (DDoS) attacks, and brute-force attacks—triggered by failed login attempts—are discussed as examples herein, the present disclosure is not so limited. Rather, embodiments can determine a range of patterns of events sufficient to trigger an alert in one log source, and preemptively alert other log sources of the network providing a same functionality as the one log source. For example, in some embodiments, alerts associated with fatal memory errors on one host (e.g., read/write errors) can be used to prevent similar errors from occurring in other hosts.

Embodiments herein can detect a pattern of events based on respective logs (e.g., event logs) associated with log sources. The log sources can create these logs and communicate them to a log management server. The log management server can monitor the logs, determine events included in the logs, and detect patterns of the events based on information in the log including, for instance, timing and/or source(s) of events.

As referred to herein, the term "log source" can sometimes refer to a virtual computing instance (VCI), which covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a software defined data center. In such a system, information can be propagated from an end user to at least one of the VCIs in the system, between VCIs in the system, and/or between at least one of the VCIs in the system and a log management server. In some embodiments, the log management server can be provided as a VCI. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. A group or plurality of similar elements or components may generally be referred to herein with a single element number. For example a plurality of reference elements 104-1, 104-2, . . . , 104-N may be referred to generally as 104. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a general logical diagram of an infrastructure with preemptive alerts in a connected environment according to the present disclosure. For example, FIG. 1 can be a diagram of a system 100 for preemptive alerts in a connected environment according to the present disclosure. The system 100 can include a log management server 102 in communication with a number of log sources 104-1, 104-2, . . . , 104-N (referred to generally herein as "log sources 104"). The log sources 104 can provide a same functionality. For example, the log sources 104 can provide email functionality. In some embodiments, the log sources 104 are configured to selectively permit client login. In some embodiments, the log sources 104 are email log sources. In some embodiments, the log sources 104 are application log sources. In a number of embodiments, the log sources 104 can be servers, such as files servers, print servers, communication servers (such as email, remote access, firewall, etc.), application servers, database servers, web servers, open source servers, and others. Embodiments herein are not intended to limit the log sources 104 to a particular type and/or functionality.

The system 100 can include an alert destination 106. The alert destination 106 can be a computing device, for instance. The alert destination can refer to a user interface such that the alert is provided to a user (e.g., an administrator). The alert destination can be an application. In some embodiments, the alert can be a message. The alert can be communicated to the alert destination 106 via an application and/or service, such as, for example, email, hypertext transfer protocol (HTTP), file transfer protocol (FTP), secure shell (SSH), etc. The log management server 102 and the number of log sources 104 are described in greater detail below in the description associated with FIG. 2 (respectively referred to therein as "log management server 202" and "log sources 204").

The log sources 104 can each record a log of activities that occur thereon. Logs can be recorded in real time, for instance. In some embodiments, logs can detail log source interaction with a client, for instance. In some embodiments, logs can track aspects of a number of applications and/or programs. In some embodiments, logs can track physical and/or virtual hardware usage. The logs can be communicated from the log sources 104 to the log management server 102. In some embodiments, the logs can be received by the log management server 102 from the log sources 104. In some embodiments, the logs may be first communicated to a log aggregator and then communicated from the log aggregator to the log management server 102.

Each log can include event information, which may define a number of "events." An event, as referred to herein, is an activity on a log source that, if occurring in a particular pattern that exceeds a threshold (e.g., an "alert threshold"), triggers an alert. The log management server 102 can translate the event information, which may be largely unstructured in some embodiments, into events. Event information included in each log can include, for instance, a timestamp of an event, a source of the event (e.g., an IP address of a client), text associated with the event, and/or a name-value pair extracted from the event. In an example where failed login attempts are defined as events, the event information received from the log source 104-1 can include an identifier of a particular client (e.g., an IP address of the client) and a number of failed login attempts to the log source 104-1 made by that client.

A pattern of events that exceeds the alert threshold, as referred to herein, can be determined by a computing device and/or by a user. In some embodiments, an alert threshold-exceeding pattern of events can include a particular number of occurrences of an event. In some embodiments, an alert threshold-exceeding pattern of events can include a number of occurrences of the event during a particular time period or at a particular frequency. In some embodiments, an alert threshold-exceeding pattern of events can include a particular sequence of different events. In some embodiments, an alert threshold-exceeding pattern of events can include a number of occurrences of the event relating to a particular source (or plurality of sources). It is to be understood that a user can dictate what types, numbers, and/or patterns of events may exceed the alert threshold and thus trigger an alert.

An alert particular to the event source can be triggered in response to the pattern of events exceeding the alert threshold. For example, a user may set an alert to be triggered responsive to one hundred failed login attempts to a log source (in this case, the log source 104-1) by a particular client. In this example, the "event" is a failed login attempt to the log source 104-1. The "threshold-exceeding pattern" of the event is a particular quantity of failed login attempts (one hundred) by the same client (the event source). In some embodiments, exceeding the alert threshold can include a time component. In an example, the alert threshold can be defined on the log management server 102 as: "alerting-threshold=[100-wrong-logins]-during-[1-hour]-from-[single-client-ip]."

Whereas previous approaches may include the log source 104-1 rejecting further attempts by the client to log in to the log source 104-1, the present disclosure goes further and allows the preemptive triggering of a sensitivity threshold on one or more of the other log sources 104 before their respective logs are determined to include the number of failed login attempts by the client that exceeds the alert threshold.

Attacks such as denial of service (DOS) attacks, distributed denial-of-service (DDoS) attacks, and brute-force attacks may involve repeated login attempts. Embodiments of the present disclosure can reduce a network's exposure to such attacks by triggering a sensitivity threshold that is more sensitive than the alert threshold. A log source having an enabled sensitivity threshold can preempt an imminent attack on that log source by reducing a number of failed login attempts to that log source leading to the triggering of another alert, for example.

As previously discussed, however, embodiments herein are not limited to the example of failed login attempts due to attacks. For example, in some embodiments, the pattern of events can indicate a log source storage error. In some embodiments, the pattern of events can indicate an application error. For example, the alert threshold can be defined on the log management server 102 as "alerting-threshold=fatal storage read/write failure."

Upon determining the alert threshold-exceeding pattern of events on the log source 104-1, the log management server 102 can initiate a sensitivity threshold of other log sources, such as the log source 104-2 and/or the log source 104-N. In some embodiments, the sensitivity threshold is particular to the event source. In some embodiments, the sensitivity threshold is more sensitive than the alert threshold. The sensitivity threshold can be a reduced threshold with respect to the alert threshold. Accordingly, log sources in a connected environment having an initiated sensitivity threshold can preemptively trigger alerts before the same pattern of events exceeding the alert threshold is detected on those servers from their respective logs. In an example, if the alert threshold is defined on the log management server 102 as: "alerting-threshold=[100-wrong-logins]-during-[1-hour]-from-[single-client-ip]" the sensitivity threshold can be defined as [10%].

Being more sensitive than the alert threshold can refer to a quantity of events needed to exceed the sensitivity threshold being less than a quantity of events needed to exceed the alert threshold. In some embodiments, being more sensitive can include a time component different than that of the alert threshold. For instance, if a pattern of events over a time period exceeds the alert threshold, the pattern of events (or a portion of the pattern of events) may exceed the sensitivity threshold if it occurs over a different (e.g., longer or shorter) time period.

For example, exceeding the sensitivity threshold can include a reduced number of failed login attempts (e.g., 10) by a client to the log sources 104-2 or 104-N (the log sources having their sensitivity thresholds initiated) with respect to a number of failed login attempts (e.g., 100) by the client that exceed the alert threshold. In some embodiments, the sensitivity threshold may be a particular portion (e.g., percentage) of the alert threshold. In some embodiments the alert threshold and/or the sensitivity threshold may be a user-defined number. Exceeding the sensitivity threshold (after the alert threshold is exceeded) can cause the triggering of an alert. In some embodiments, the sensitivity threshold can be reduced to zero such that an alert is triggered when any attempt is made by the client to log in.

The sensitivity threshold can include more than one definition in some embodiments. For instance, if the alert threshold is defined on the log management server 102 as "alerting-threshold=fatal storage read/write failure" the sensitivity threshold can be defined as "[input/output operations per second (IOPS)/latency degradation] OR [2 consecutive non-fatal read/write failures]."

The alert triggered by the exceeding of the second threshold can include contextual information, such as, for instance "alert-1: possible attack from client-ip" or "alert-2: possibly [time-2] hours before storage is down."

Figure 2:
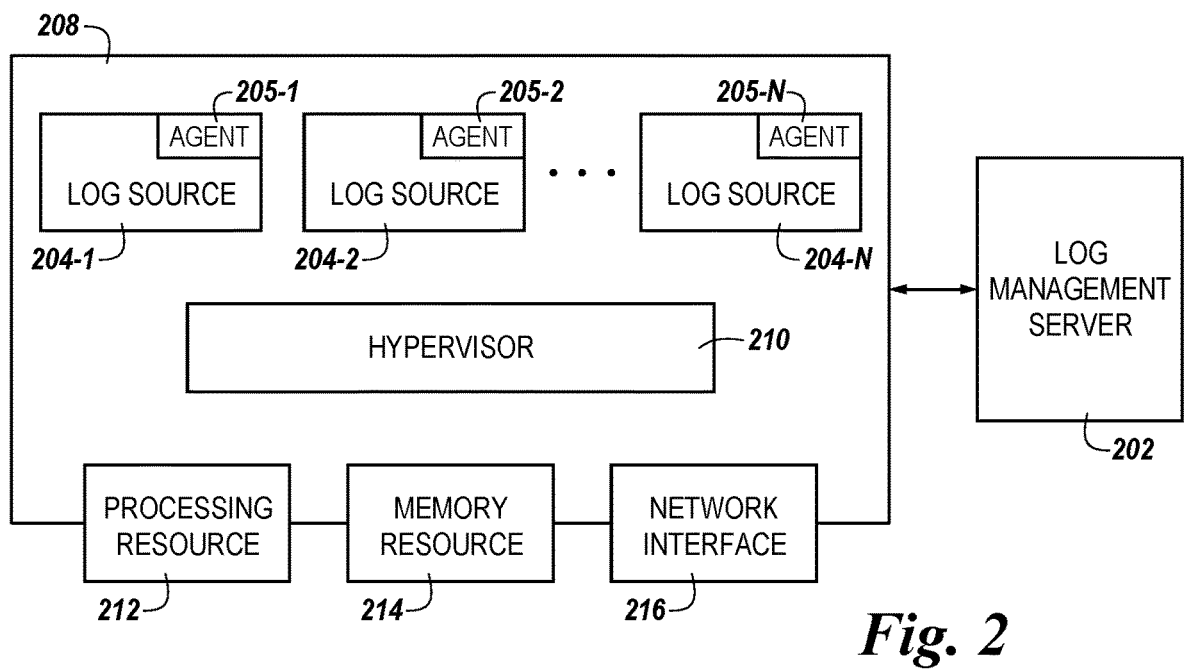
FIG. 2 is a diagram of an example of an infrastructure with preemptive alerts in a connected environment according to the present disclosure.

FIG. 2 is a diagram of an example of an infrastructure with preemptive alerts in a connected environment according to the present disclosure. For example, FIG. 2 can be a diagram of a host 208 for preemptive alerts in a connected environment according to the present disclosure. It is noted that embodiments of the present disclosure are not limited to the host 208 illustrated in FIG. 2; as previously discussed, preemptive alerts can be provided in other environments. The host 208 can include processing resources 212 (e.g., a number of processors), memory resources 214, and/or a network interface 216. Memory resources 214 can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. For example, the memory resources 214 may comprise primary and/or secondary storage.

The host 208 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 208 can incorporate a hypervisor 210 that can execute a number of VCIs 204-1, 204-2, . . . , 204-N that can each provide the functionality of a log source, as previously discussed. As such, the VCIs may be referred to herein as "log sources." The log sources 204-1, 204-2, . . . , 204-N are referred to generally herein as "log sources 204." The log sources 204 can be provisioned with processing resources 212 and/or memory resources 214 and can communicate via the network interface 216. The processing resources 212 and the memory resources 214 provisioned to the log sources 204 can be local and/or remote to the host 208. For example, in a software defined data center, the log sources 204 can be provisioned with resources that are generally available to the software defined data center and are not tied to any particular hardware device. By way of example, the memory resources 214 can include volatile and/or non-volatile memory available to the log sources 204. The log sources 204 can be moved to different hosts (not specifically illustrated), such that different hypervisors manage the log sources 204. In some embodiments, a log source among the number of log sources can be a master log source. For example, log source 204-1 can be a master log source, and log sources 204-2, . . . , 204-N can be slave log sources. The host 208 can be in communication with log management server 202. In some embodiments, each log source 204 can include a respective logging agent 205-1, 205-2, . . . , 205-N (referred to generally herein as logging agents 205) deployed thereon.

The log management server 202 can be configured to receive logs from each of the log sources 204. The logging agents 205 can record logs associated with the log sources 204. The logging agents 205 can communicate (e.g., report) the logs to the log management server 202. In some embodiments, the logging agents 205 can report the logs to the log management server 202 in real time and/or in response to a request.

The log management server 202 can analyze the logs received from the respective logging agent 205 and/or determine whether a pattern of events in the log(s) exceeds an alert threshold. In response to the pattern of events exceeding the alert threshold, the log management server 202 can trigger an alert particular to the event source. In response to the pattern of events on a first log source (e.g., log source 104-1) exceeding the alert threshold, the log management server 202 can initiate a sensitivity threshold of a second log source (e.g., log source 204-2) that provides a same functionality as the first log source.

As previously discussed, the sensitivity threshold can be more sensitive than the alert threshold, which, in some embodiments, can refer to a quantity of events needed to exceed the sensitivity threshold being less than a quantity of events needed to exceed the alert threshold. In some embodiments, being more sensitive can include a time component. For instance, if a pattern of events over a time period exceeds the alert threshold, the pattern of events (or a portion of the pattern of events) may exceed the sensitivity threshold if it occurs over a different (e.g., longer or shorter) time period As previously discussed, however, thresholds and/or alerts are not limited to those associated with failed login attempts. Alerts can be issued based on log source storage errors, application errors, and in other instances.

In some embodiments, the log management server 202 can include a combination of software and hardware, or the management server 202 can include software and can be provisioned by the processing resource 212. An example of the log management server 202 is illustrated and described in more detail with respect to FIG. 3.

Figure 3:
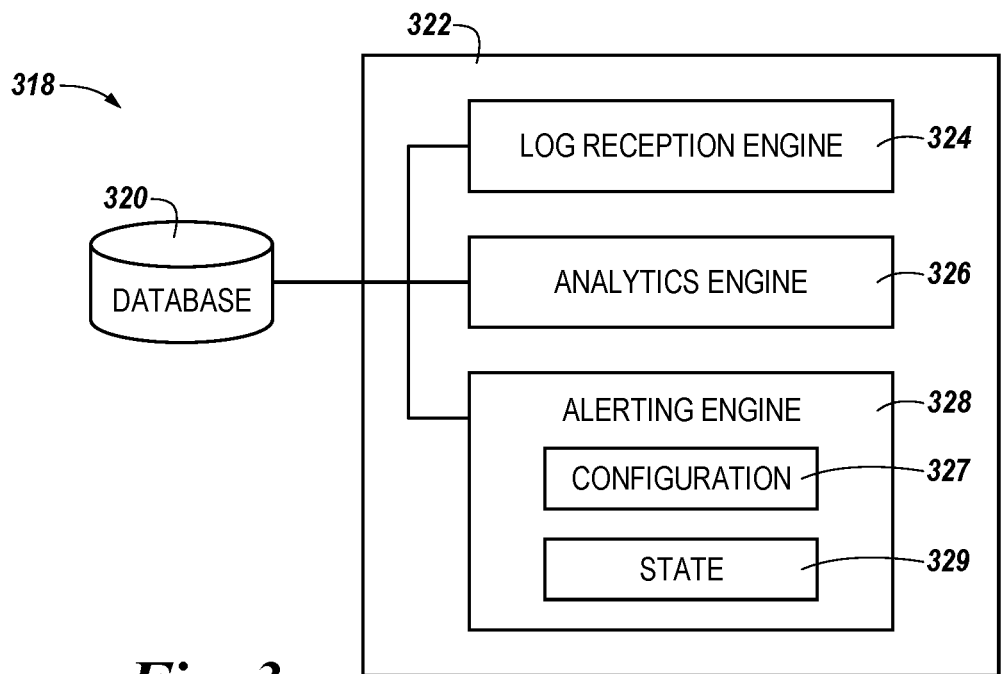
FIG. 3 is a diagram of a general logical system structure implementing preemptive alerts in a connected environment according to the present disclosure.

FIG. 3 is a diagram of a general logical system structure implementing preemptive alerts in a connected environment according to the present disclosure. For example, FIG. 3 can be a diagram of a system for preemptive alerts in a connected environment according to the present disclosure. The system 318 can include a database 320, a subsystem 322, and/or a number of engines, for example a log reception engine 324, an analytics engine 326, and/or an alerting engine 328 (including and/or having access to configuration data 327 and state data 329), and can be in communication with the database 320 via a communication link. The system 318 can include additional or fewer engines than illustrated to perform the various functions described herein. The system 318 can represent program instructions and/or hardware of a machine (e.g., machine 430 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines (e.g., 324, 326, 328) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the log reception engine 324 can include a combination of hardware and program instructions that can be configured to receive a log from a first log source. The log can include identifiers of event sources, for instance.

The analytics engine 326 can be configured to determine whether a pattern of events in the log exceeds an alert threshold of the first log source, wherein the pattern of events is associated with a particular event source. In an example, exceeding the threshold can include a number of failed login attempts to the first log source being made in a particular period of time.

In some embodiments, the alerting engine 328 can be configured to trigger an alert particular to the event source in response to the pattern of events exceeding the alert threshold. In some embodiments, the alerting engine 328 can be configured to initiate a sensitivity threshold of a second log source that provides a same functionality as the first log source in response to the pattern of events exceeding the alert threshold. The sensitivity threshold can be particular to the event source, and can be more sensitive than the alert threshold.

The alerting engine includes and/or has access to data, including the configuration data 327 and the state data 329. The configuration data 327 can include definitions of the alert threshold and/or the sensitivity threshold. In some embodiments, the alert threshold can be a same threshold for multiple (or all) log sources of the connected environment. In some embodiments, the sensitivity threshold can be a same threshold for multiple (or all) log sources of the connected environment. In some embodiments, a log source may have a unique alert threshold and/or unique sensitivity threshold. The thresholds can be automatically configured (e.g., without user input). The thresholds can be user-defined. The alert threshold can relate to the sensitivity threshold in a particular manner. For example, the sensitivity threshold may be a particular percentage of the alert threshold.

The state data 329 can include data for connected alerts. The state data 329 can include information contained in an alert, for instance. In the example of failed login attempts to email servers, the state data 329 can include a number of failed login attempts over a particular time period and an identifier of the attacking client (e.g., an IP address of the client).

Figure 4:
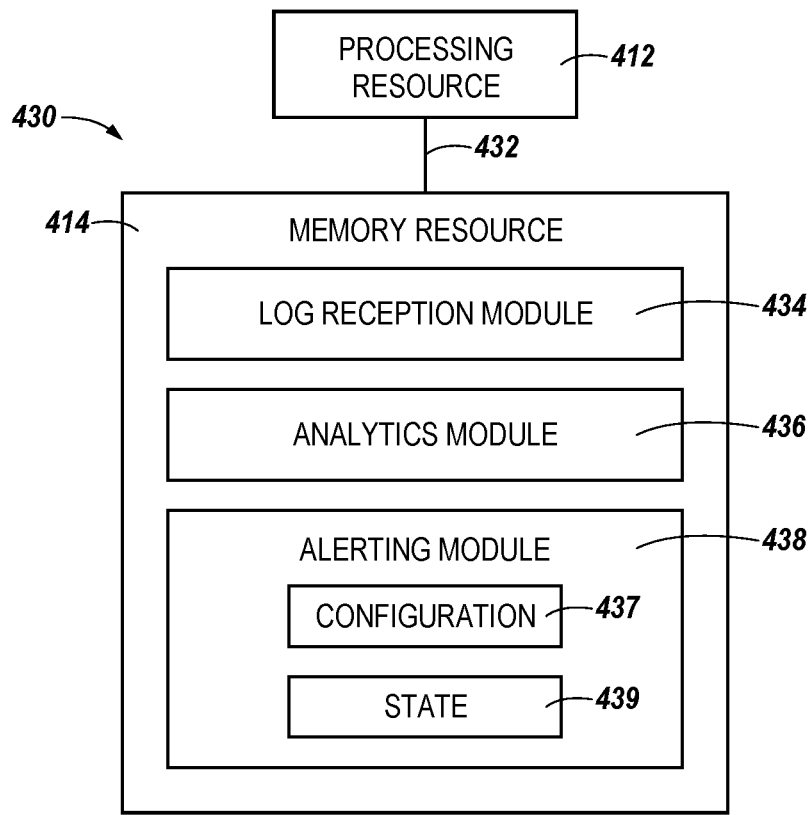
FIG. 4 is a diagram of an example system structure implementing preemptive alerts in a connected environment according to the present disclosure.

FIG. 4 is a diagram of an example system structure implementing preemptive alerts in a connected environment according to the present disclosure. For example, FIG. 4 can be a diagram of a machine for preemptive alerts in a connected environment according to the present disclosure. The machine 430 can utilize software, hardware, firmware, and/or logic to perform a number of functions. The machine 430 can be a combination of hardware and program instructions configured to perform a number of functions (e.g., actions). The hardware, for example, can include a number of processing resources 412 and a number of memory resources 414, such as a machine-readable medium (MRM) or other memory resources 414. The memory resources 414 can be internal and/or external to the machine 430 (e.g., the machine 430 can include internal memory resources and have access to external memory resources). In some embodiments, the machine 430 can be a log management server, for example, analogous to the log management server 202, previously discussed in connection with FIG. 2. The program instructions (e.g., machine-readable instructions (MRI)) can include instructions stored on the MRM to implement a particular function (e.g., an action such as issuing alerts to log sources). The set of MRI can be executable by one or more of the processing resources 412. The memory resources 414 can be coupled to the machine 430 in a wired and/or wireless manner. For example, the memory resources 414 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

The memory resources 414 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 412 can be coupled to the memory resources 414 via a communication path 432. The communication path 432 can be local or remote to the machine 430. Examples of a local communication path 432 can include an electronic bus internal to a machine, where the memory resources 414 are in communication with the processing resources 412 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 432 can be such that the memory resources 414 are remote from the processing resources 412, such as in a network connection between the memory resources 414 and the processing resources 412. That is, the communication path 432 can be a network connection. Examples of such a network connection can include a local area network (LAN), wide area network (WAN), personal area network (PAN), and the Internet, among others.

As shown in FIG. 4, the MRI stored in the memory resources 414 can be segmented into a number of modules 434, 436, 438 that when executed by the processing resources 412 can perform a number of functions. As used herein a module includes a set of instructions included to perform a particular task or action. The number of modules 434, 436, 438 can be sub-modules of other modules. For example, the alerting module 438 can be a sub-module of the analytics engine 436 and/or can be contained within a single module. Furthermore, the number of modules 434, 436, 438 can comprise individual modules separate and distinct from one another. Examples are not limited to the specific modules 434, 436, 438 illustrated in FIG. 4.

Each of the number of modules 434, 436, 438 can include program instructions and/or a combination of hardware and program instructions that, when executed by a processing resource 412, can function as a corresponding engine as described with respect to FIG. 3. For example, the log reception module 434 can include program instructions and/or a combination of hardware and program instructions that, when executed by a processing resource 412, can function as the log reception engine 324, the analytics module 436 can include program instructions and/or a combination of hardware and program instructions that, when executed by a processing resource 412, can function as the analytics engine 326, and/or the alerting module 438 can include program instructions and/or a combination of hardware and program instructions that, when executed by a processing resource 412, can function as the alerting engine 328. Similarly, the configuration data 437 and state data 439 can be included in the alerting module 438 as the configuration data 327 and state data 329 are included in the alerting engine 328.

Figure 5:
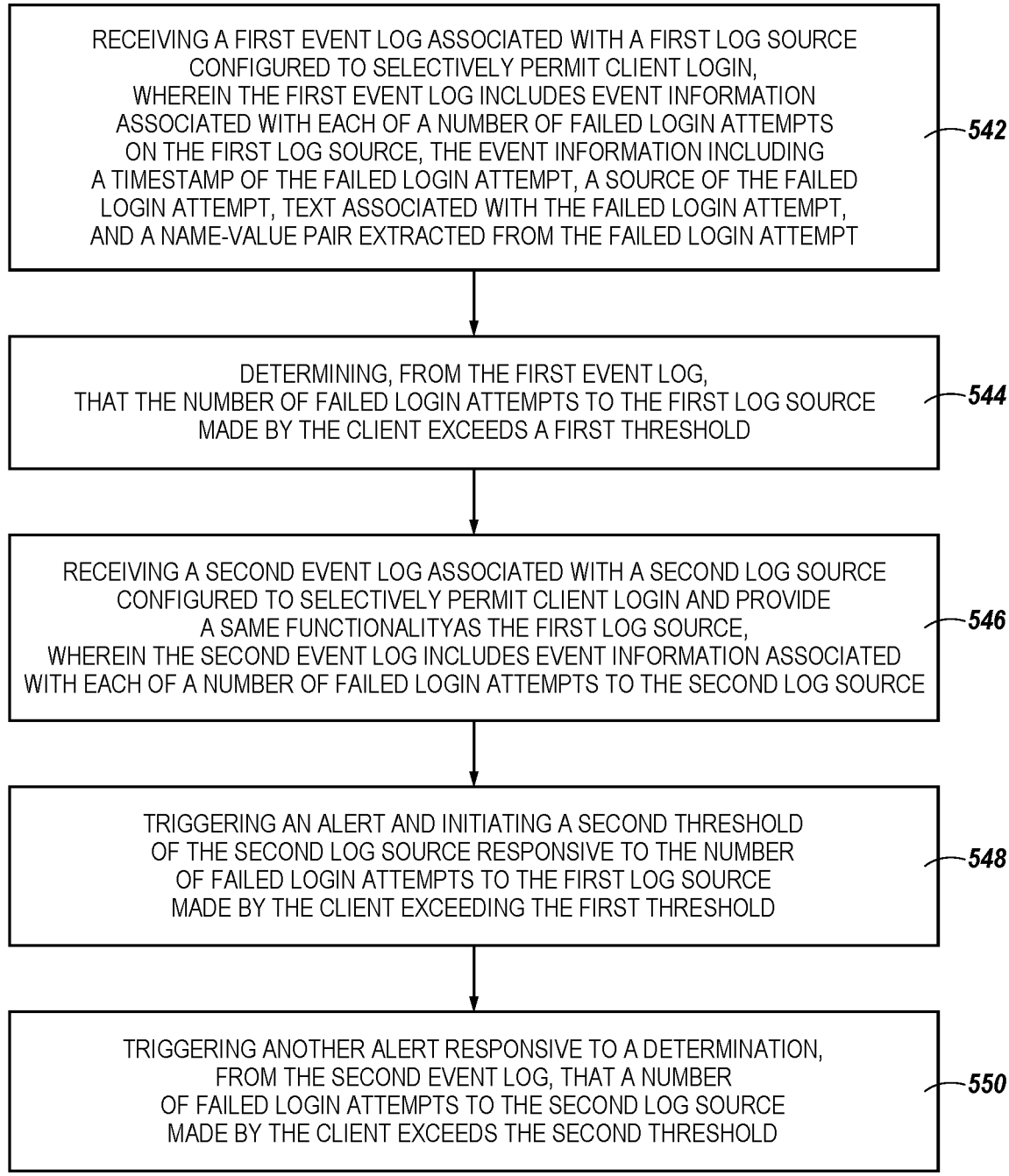
FIG. 5 is a flow chart illustrating a method for preemptive alerts in a connected environment according to the present disclosure.

FIG. 5 is a flow chart illustrating a number of methods for sharing alerts in a connected environment according to the present disclosure. At 542, the method 540 can include receiving a first event log associated with a first log source configured to selectively permit client login, wherein the first event log includes event information associated with each of a number of failed login attempts on the first log source, the event information including a timestamp of the failed login attempt, a source of the failed login attempt, text associated with the failed login attempt, and a name-value pair extracted from the failed login attempt.

In some embodiments, the method 540 can include receiving the first and second event logs from the first and second log sources, respectively. In some embodiments, the method 540 can include receiving the first and second event logs from a log aggregator.

At 544, the method 540 can include determining, from the first event log, that the number of failed login attempts to the first log source made by the client exceeds a first threshold. The first threshold can be an alert threshold, as previously discussed, for instance.

At 546, the method 540 can include receiving a second event log associated with a second log source configured to selectively permit client login and provide a same functionality as the first log source, wherein the second event log includes event information associated with each of a number of failed login attempts to the second log source.

At 548, the method 540 can include triggering an alert and initiating a second threshold of the second log source responsive to the number of failed login attempts to the first log source made by the client exceeding the first threshold. In some embodiments, the second threshold can be a sensitivity threshold, which can be a particular numerical value. In some embodiments, the sensitivity threshold can have a relationship with the alert threshold. For example, the second threshold can be a particular percentage of the first threshold.

At 550, the method 540 can include triggering another alert responsive to a determination, from the second event log, that a number of failed login attempts to the second log source made by the client exceeds the second threshold.

Figure 6:
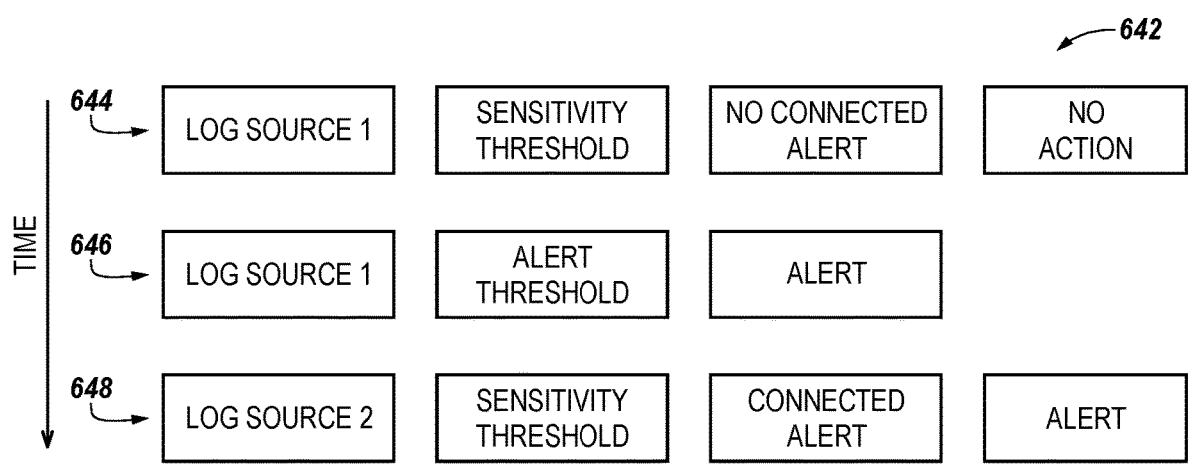
FIG. 6 is a flow chart associated with preemptive alerts in a connected environment in accordance with one or more embodiments of the present disclosure.

FIG. 6 illustrates a flow chart 642 associated with pre-emptive alerts in a connected environment in accordance with one or more embodiments of the present disclosure. The flow chart 642 illustrates a process in accordance with the present disclosure that occurs over a time period. At 644, a pattern of events in log source 1 reaches a sensitivity threshold but does not reach an alert threshold. Accordingly, a connected alert is not triggered and no action is taken.

At 646, a pattern of events in log source 1 extends beyond the sensitivity threshold and reaches the alert threshold. Accordingly, an alert is triggered for log source 1. In an example, for instance, a particular client (identified by the IP address of the client) attempts and fails to log in to a first email server a particular number of times (e.g., 100 times) in a particular time period (e.g., 1 hour), exceeding the alert threshold. Subsequently, at 648, a sensitivity threshold in log source 2, having been initiated by the connected alert from the pattern of events in log source 1, is exceeded for log source 2. Continuing in the example above, if the particular client (i.e., the same client) attempts and fails to log in a particular number of times (e.g., 10 times) to a second email server, after having attempted and failed to log in 100 times to the first email server (thus generating the alert), the sensitivity threshold may be exceeded. Exceeding the sensitivity threshold for log source 2 causes an alert to be triggered for log source 2.

As shown in FIG. 6, the alert threshold need not be exceeded for log source 2 in order for an alert for log source 2 to be triggered. When the alert is triggered for log source 1, the sensitivity threshold for log source 2 is initiated. After this initiation, a pattern of events that exceeds the sensitivity threshold in log source 2 can then trigger an alert.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium storing instructions executable by a processing resource to cause a computing system to:
   receive a first log from a first log source;
   determine whether a pattern of events in the first log exceeds an alert threshold of the first log source, wherein the pattern of events is associated with a particular client;
   in response to the pattern of events in the first log exceeding the alert threshold, trigger a first alert particular to the client;
   in response to the pattern of events in the first log exceeding the alert threshold, initiate a sensitivity threshold for a second log source that provides a same functionality as the first log source, wherein the second log source includes the alert threshold same as the first log source,
   wherein the sensitivity threshold is less than the alert threshold, and wherein the sensitivity threshold is initiated particular to the client;
   receive a second log from the second log source;
   determine whether a pattern of events, corresponding to the particular client, in the second log exceeds the sensitivity threshold of the second log source; and
   in response to the pattern of events in the second log exceeding the sensitivity threshold, trigger a second alert particular to the client.

2. The medium of claim 1, wherein the instructions to determine whether the pattern of events in the first log exceeds the alert threshold include instructions to determine whether a particular number of events associated with the particular client occurred over a particular time period.

3. The medium of claim 2, wherein the instructions include instructions to trigger the second alert in response to the determination that the pattern of events in the second log exceeds the sensitivity threshold but does not exceed the alert threshold.

4. The medium of claim 1, Wherein the first and second log sources are email servers.

5. The medium of claim 1, wherein the events are failed login attempts, and wherein the instructions to determine whether the pattern of events in the first log exceeds the alert threshold include instructions to determine that a number of failed login attempts to the first log source by the particular client exceeds a particular quantity.

6. The medium of claim 1, wherein the first and second log sources are virtual computing instances.

7. The medium of claim 1, wherein the sensitivity threshold is a user-defined quantity.

8. The medium of claim 1, wherein the sensitivity threshold is a particular percentage of the alert threshold.

9. The medium of claim 1, wherein the pattern of events in the first log exceeding the alert threshold is indicative of an attack on the first log source.

10. The medium of claim 9, wherein the pattern of events in the first log exceeding the alert threshold indicates at least one of: a denial of service (DOS) attack, a distributed denial-of-service (DDoS) attack, and a brute-force attack.

11. The medium of claim 1, wherein the pattern of events in the first log exceeding the alert threshold indicates a log source storage failure.

12. The medium of claim 1, wherein the pattern of events in the first log exceeding the alert threshold indicates an application error.

13. A system, comprising:
   a first log source configured to selectively permit client login;
   a second log source configured to selectively permit client login, wherein the first and second log sources provide a same functionality, and wherein the second log source includes an alert threshold same as the first log source; and
   a log management server having a memory and processor configured to execute instructions stored on the memory to:
     receive a first log from the first log source, wherein the first log includes an identifier of a particular client and a number of failed login attempts to the first log source made by the client;
     trigger a first alert responsive to a determination, from the first log, that the number of failed login attempts to the first log source made by the client exceeds the alert threshold;
     initiate a sensitivity threshold for the second log source responsive to the determination, wherein the sensitivity threshold is particular to the client, and wherein the sensitivity threshold is less than the alert threshold;
     receive a second log from the second log source, wherein the second log includes the identifier of the particular client and a number of failed login attempts to the second log source made by the client; and trigger a second alert responsive to a determination, from the second log, that the number of failed login attempts to the second log source made by the client exceeds the sensitivity threshold.

14. The system of claim 13, wherein the first and second log sources are virtual application servers.

15. The system claim 13, wherein the identifier is an IP address associated with the client.

16. The system of claim 13, wherein the alert threshold cannot be exceeded without exceeding the sensitivity threshold.

17. A method, comprising:
receiving a first event log associated with a first log source configured to selectively permit client login, wherein the first event log includes event information associated with each of a number of failed login attempts on the first log source made by a client, the event information including:
  timestamp of the failed login attempt;
  a source of the failed login attempt;
  text associated with the failed login attempt; and
  a name-value pair extracted from the failed login attempt;
determining, from the first event log, that the number of failed login attempts to the first log source made by the client exceeds a first threshold;
triggering a first alert and initiating a second threshold for a second log source responsive to the number of failed login attempts to the first log source made by the client exceeding the first threshold, wherein the second log source includes the alert threshold same as the first log source, and wherein the second threshold is particular to the client and less than the first threshold;
receiving a second event log associated with the second log source configured to selectively permit client login and provide a same functionality as the first log source, and wherein the second event log includes event information associated with each of a number of failed login attempts on the second log source made by the client;
triggering a second alert responsive to a determination, from the second event log, that the number of failed login attempts to the second log source made by the client exceeds the second threshold.

18. The medium of claim 17, wherein the method includes receiving the first and second event logs from the first and second log sources, respectively.

19. The medium of claim 17, wherein the method includes receiving the first and second event logs from a log aggregator.

* * * * *